US011627499B2

(12) United States Patent
Sarkis et al.

(10) Patent No.: US 11,627,499 B2
(45) Date of Patent: Apr. 11, 2023

(54) RECLAIMING RESERVATIONS IN SIDELINK COMMUNICATIONS

(71) Applicant: QUALCOMM Incorporated, San Diego, CA (US)

(72) Inventors: Gabi Sarkis, San Diego, CA (US); Kapil Gulati, Montgomery, NJ (US); Tien Viet Nguyen, Bridgewater, NJ (US); Shuanshuan Wu, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/031,371

(22) Filed: Sep. 24, 2020

(65) Prior Publication Data

US 2021/0099919 A1  Apr. 1, 2021

Related U.S. Application Data

(60) Provisional application No. 62/907,018, filed on Sep. 27, 2019.

(51) Int. Cl.
*H04W 28/26* (2009.01)
*H04W 72/0446* (2023.01)
(Continued)

(52) U.S. Cl.
CPC ........... *H04W 28/26* (2013.01); *H04W 72/02* (2013.01); *H04W 72/0446* (2013.01); *H04W 92/18* (2013.01)

(58) Field of Classification Search
CPC . H04W 28/26; H04W 72/02; H04W 72/0446; H04W 92/18; H04W 72/0406; H04W 4/70; H04W 4/40
See application file for complete search history.

(56) References Cited

U.S. PATENT DOCUMENTS

2018/0035427 A1  2/2018  Gupta et al.
2018/0317221 A1  11/2018  Yasukawa et al.
(Continued)

OTHER PUBLICATIONS

3GPP TSG-RAN WG1 #98bis, "Sidelink Resource Allocation Mechanism for NR V2X", Oct. 14-20, 2019 (Year: 2019).*
(Continued)

*Primary Examiner* — Jae Y Lee
*Assistant Examiner* — Aixa A Guadalupe Cruz
(74) *Attorney, Agent, or Firm* — Patterson + Sheridan, LLP

(57) ABSTRACT

Certain aspects of the present disclosure provide techniques for managing resource reservations in sidelink communications. A method that may be performed by a first user equipment (UE) includes determining a plurality of resource reservations allocated for sidelink communications with at least one second UE and transmitting, to the at least one second UE, control information having an indication of the resource reservations. The method also includes communicating with the at least one second UE during at least one of the resource reservations and determining that a remaining set of the resource reservations is enabled to be reclaimed by one or more UEs. The method further includes taking one or more actions based on the determination that the remaining set of the resource reservations is enabled to be reclaimed by the one or more UEs.

28 Claims, 9 Drawing Sheets

(51) Int. Cl.
H04W 72/02 (2009.01)
H04W 92/18 (2009.01)

(56) References Cited

U.S. PATENT DOCUMENTS

2018/0338319 A1* 11/2018 Kim ..................... H04L 5/0053
2019/0007994 A1    1/2019 Nam et al.
2019/0357304 A1* 11/2019 Zeng ....................... H04W 4/40
2021/0058938 A1*  2/2021 Hosseini ............. H04W 52/383
2021/0314750 A1* 10/2021 Nguyen ............ H04W 72/1242

OTHER PUBLICATIONS

International Search Report and Written Opinion—PCT/US2020/052797—ISA/EPO—dated Nov. 25, 2020.
NTT Docomo, et al., "Transmitter UE Behaviour for Sensing-Based Resource Allocation", 3GPP Draft, 3GPP TSG RAN WG1 Meeting #85, R1-165192 Reservation and Sensing Sidelink, 3rd Generation Partnership Project (3GPP), Mobile Competence Centre, 650, Route Des Lucioles, F-06921 Sophia-Antipolis Cedex, France, vol. RAN WG1, No. Nanjing, China, May 23, 2016-May 27, 2016, May 14, 2016 (May 14, 2016), XP051096221, 7 Pages, Retrieved from the Internet: URL: http://www.3gpp.org/ftp/tsg_ran/WG1_RL1/TSGR1_85/Docs/, [retrieved on May 14, 2016], paragraph [0002]—paragraph [0004].

* cited by examiner

RECLAIMING RESERVATIONS IN SIDELINK COMMUNICATIONS

CROSS-REFERENCE TO RELATED APPLICATION

This application claims benefit of and priority to U.S. Provisional Patent Application No. 62/907,018, filed Sep. 27, 2019, which is hereby incorporated by reference in its entirety.

BACKGROUND

Field of the Disclosure

Aspects of the present disclosure relate to wireless communications, and more particularly, to techniques for managing resource reservations for sidelink communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that may include desirable resource reservations for sidelink communications.

Certain aspects provide a method for wireless communication by a first user equipment (UE). The method generally includes determining a plurality of resource reservations allocated for sidelink communications with at least one second UE and transmitting, to the at least one second UE, control information having an indication of the resource reservations. The method also includes communicating with the at least one second UE during at least one of the resource reservations and determining that a remaining set of the resource reservations is enabled to be reclaimed by one or more UEs. The method further includes taking one or more actions based on the determination that the remaining set of the resource reservations is enabled to be reclaimed by the one or more UEs.

Certain aspects provide a method for wireless communication by a second UE. The method generally includes receiving, from a first UE, control information having an indication of resource reservations allocated for sidelink communications with the first UE and communicating with the first UE during at least one of the resource reservations. The method also includes determining that a remaining set of the resource reservations is enabled to be reclaimed by one or more UEs and taking one or more actions based on the determination that the remaining set of the resource reservations is enabled to be reclaimed by the one or more UEs.

Certain aspects provide a method for wireless communication by a first UE. The method generally includes determining a plurality of resource reservations allocated for sidelink communications with a second UE and transmitting, to the second UE, control information having an indication of a number of valid resource reservations including the determined resource reservations. The method also includes communicating with the second UE during at least one of the resource reservations.

Certain aspects provide a method for wireless communication by a second UE. The method generally includes receiving, from a first UE, control information having an indication of a number of valid resource reservations allocated for sidelink communications with the first UE. The method also includes determining time and frequency resource allocations for communicating with the first UE based on the indication of the valid resource reservations and communicating with the first UE based on the determination of the time and frequency resource allocations.

Certain aspects provide an apparatus for wireless communication. The apparatus generally includes a memory, a processor, and a transceiver. The processor is coupled to the memory, where the processor and the memory are configured to determine a plurality of resource reservations allocated for sidelink communications with at least one UE. The transceiver is configured to transmit, to the at least one UE, control information having an indication of the resource reservations, and communicate with the at least one UE during at least one of the resource reservations. The processor and the memory are further configured to determine that a remaining set of the resource reservations is enabled to be reclaimed by one or more UEs, and take one or more actions based on the determination that the remaining set of the resource reservations is enabled to be reclaimed by the one or more UEs.

Certain aspects provide an apparatus for wireless communication. The apparatus generally includes a transceiver, a memory, and a processor. The transceiver is configured to receive, from a UE, control information having an indication of resource reservations allocated for sidelink communications with the UE, and communicate with the UE during at least one of the resource reservations. The processor is coupled to the memory, where the processor and the memory are configured to determine that a remaining set of the resource reservations is enabled to be reclaimed by one or more UEs, and take one or more actions based on the determination that the remaining set of the resource reservations is enabled to be reclaimed by the one or more UEs.

Certain aspects provide an apparatus for wireless communication. The apparatus generally includes a memory, a processor, and a transceiver. The processor is coupled to the memory, where the processor and the memory are configured to determine a plurality of resource reservations allocated for sidelink communications with a UE. The transceiver is configured to transmit, to the UE, control information having an indication of a number of valid resource reservations including the determined resource reservations and communicate with the UE during at least one of the resource reservations.

Certain aspects provide an apparatus for wireless communication. The apparatus generally includes a memory, a processor, and a transceiver. The transceiver is configured to receive, from a UE, control information having an indication of a number of valid resource reservations allocated for sidelink communications with the UE. The processor is coupled to the memory, where the processor and the memory are configured to determine time and frequency resource allocations for communicating with the UE based on the indication of the valid resource reservations. The transceiver is further configured to communicate with the UE based on the determination of the time and frequency resource allocations.

Certain aspects provide an apparatus for wireless communication. The apparatus generally includes means for determining a plurality of resource reservations allocated for sidelink communications with at least one UE; means for transmitting, to the at least one UE, control information having an indication of the resource reservations; means for communicating with the at least one UE during at least one of the resource reservations; means for determining that a remaining set of the resource reservations is enabled to be reclaimed by one or more UEs; and means for taking one or more actions based on the determination that the remaining set of the resource reservations is enabled to be reclaimed by the one or more UEs.

Certain aspects provide an apparatus for wireless communication. The apparatus generally includes means for receiving, from a UE, control information having an indication of resource reservations allocated for sidelink communications with the UE; means for communicating with the UE during at least one of the resource reservations; means for determining that a remaining set of the resource reservations is enabled to be reclaimed by one or more UEs; and means for taking one or more actions based on the determination that the remaining set of the resource reservations is enabled to be reclaimed by the one or more UEs.

Certain aspects provide an apparatus for wireless communication. The apparatus generally includes means for determining a plurality of resource reservations allocated for sidelink communications with a UE; means for transmitting, to the UE, control information having an indication of a number of valid resource reservations including the determined resource reservations; and means for communicating with the UE during at least one of the resource reservations.

Certain aspects provide an apparatus for wireless communication. The apparatus generally includes means for receiving, from a UE, control information having an indication of a number of valid resource reservations allocated for sidelink communications with the UE; means for determining time and frequency resource allocations for communicating with the UE based on the indication of the valid resource reservations; and means for communicating with the UE based on the determination of the time and frequency resource allocations.

Certain aspects provide a computer readable medium having instructions stored thereon for determining a plurality of resource reservations allocated for sidelink communications with at least one UE; transmitting, to the at least one UE, control information having an indication of the resource reservations; communicating with the at least one UE during at least one of the resource reservations; determining that a remaining set of the resource reservations is enabled to be reclaimed by one or more UEs; and taking one or more actions based on the determination that the remaining set of the resource reservations is enabled to be reclaimed by the one or more UEs.

Certain aspects provide a computer readable medium having instructions stored thereon for receiving, from a UE, control information having an indication of resource reservations allocated for sidelink communications with the UE; communicating with the UE during at least one of the resource reservations; determining that a remaining set of the resource reservations is enabled to be reclaimed by one or more UEs; and taking one or more actions based on the determination that the remaining set of the resource reservations is enabled to be reclaimed by the one or more UEs.

Certain aspects provide a computer readable medium having instructions stored thereon for determining a plurality of resource reservations allocated for sidelink communications with a UE; transmitting, to the UE, control information having an indication of a number of valid resource reservations including the determined resource reservations; and communicating with the UE during at least one of the resource reservations.

Certain aspects provide a computer readable medium having instructions stored thereon for receiving, from a user equipment (UE), control information having an indication of a number of valid resource reservations allocated for sidelink communications with the UE; determining time and frequency resource allocations for communicating with the UE based on the indication of the valid resource reservations; and communicating with the UE based on the determination of the time and frequency resource allocations.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
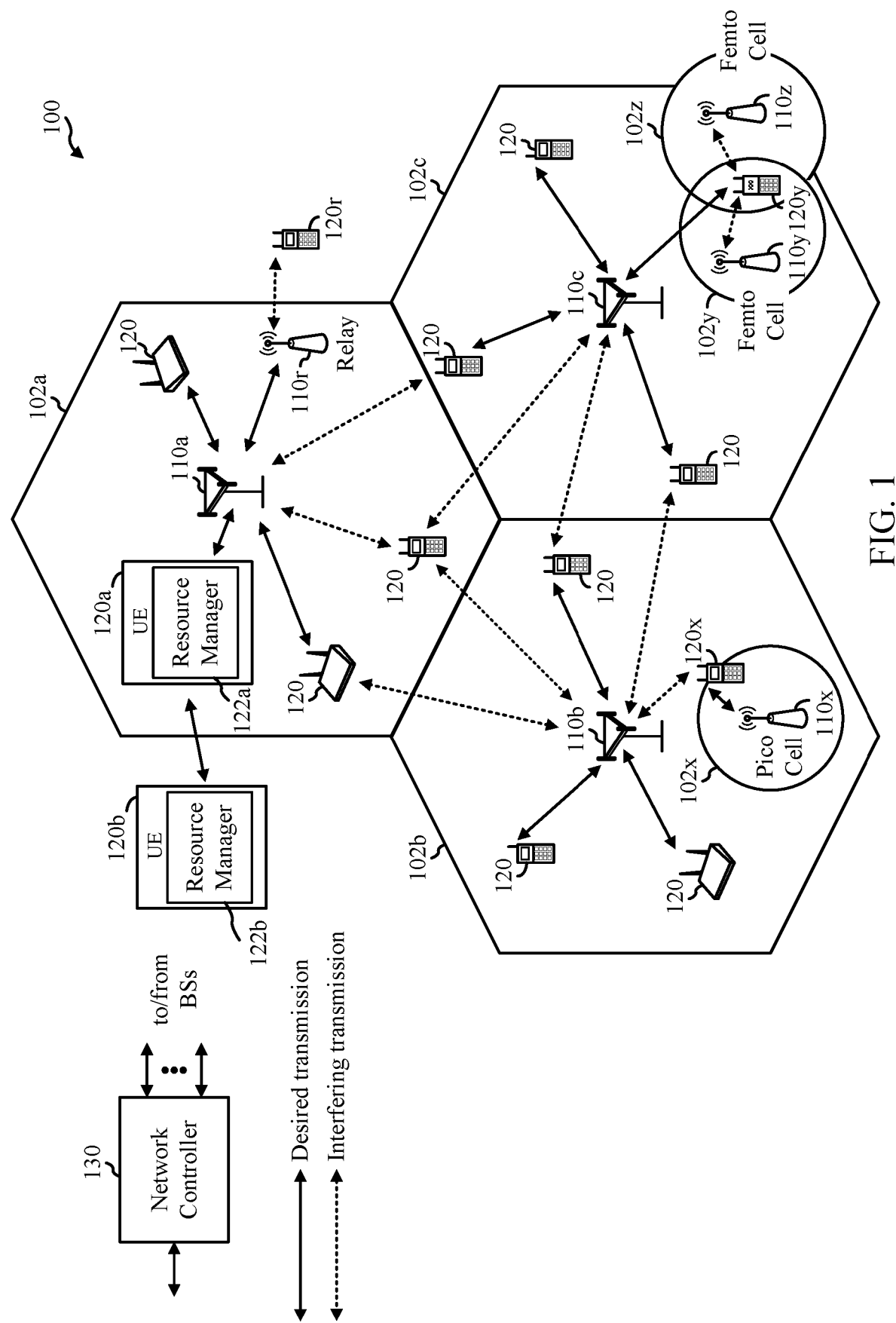
FIG. 1 is a block diagram conceptually illustrating an example telecommunications system, in accordance with certain aspects of the present disclosure.

Aspects of the present disclosure provide apparatus, methods, processing systems, and computer readable mediums for managing resource reservations for sidelink communications. Monitoring sidelink feedback from a user equipment (UE) may be an inefficient method of determining whether resources are available for reclaiming for other transmissions. Aspects of the present disclosure provide various techniques for reclaiming one or more resource reserved for sidelink transmissions. The techniques described herein may provide an efficient method of determining whether resource reservations for sidelink transmission are available for reclaiming for other transmissions such as other sidelink transmissions (e.g., transmissions between UEs) or Uu transmissions (e.g., transmissions between UE and a base station). For instance, the techniques described herein may enable reclaiming of reserved resources without having UEs monitor all feedback transmissions (e.g., on a physical sidelink feedback channel (PSFCH)), which may lead to desirable power consumption and/or battery life of certain wireless communication devices.

The following description provides examples of sidelink resource reservation management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As shown in FIG. 1, a first UE 120a may be communicating with a second UE 120b via sidelink resource reservations as further described herein. The first UE 120a includes a resource manager 122a that determines whether any resource reservations for sidelink communications are available to be reclaimed for other transmissions, and the second UE 120b includes a resource manager 122b that determines whether any resource reservations for sidelink communications are available to be reclaimed for other transmissions, in accordance with aspects of the present disclosure.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions. The PSSCH may carry data transmissions, and the PSFCH may carry feedback such as hybrid automatic repeat request (HARD) feedback and/or channel state information related to a sidelink channel quality.

NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 24 GHz to 53 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported, as multi-layer transmissions. Aggregation of multiple cells may be supported.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
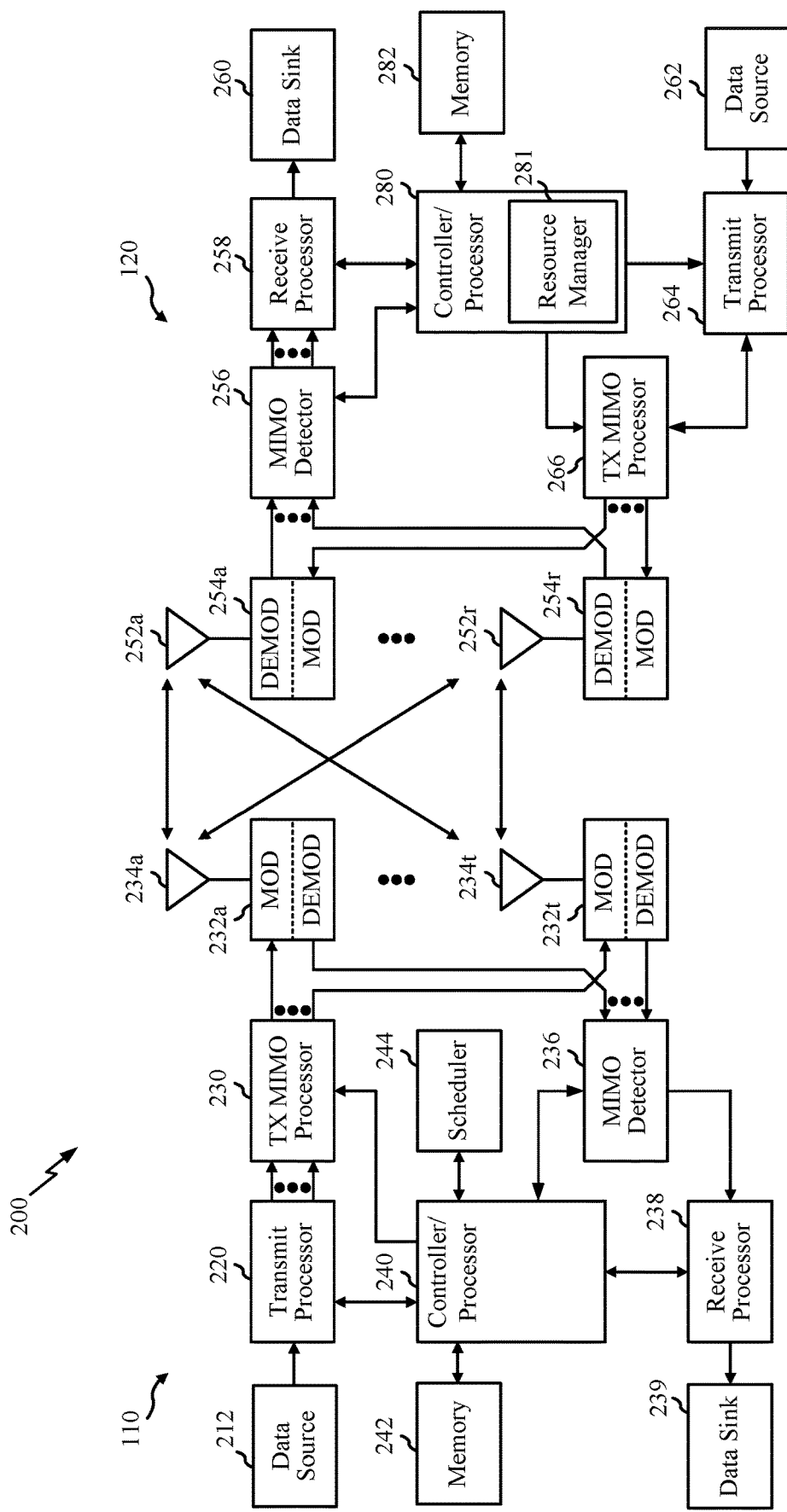
FIG. 2 is a block diagram conceptually illustrating a design of an example of a base station (BS) and a user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure.

At the BS 110, a transmit processor 220 may receive data from a data source 212 and control information from a controller/processor 240. The control information may be for PSDCH, PSCCH, PSSCH, PSFCH, etc. The data may be for the physical downlink shared channel (PDSCH), etc. The processor 220 may process (e.g., encode and symbol map) the data and the control information to obtain data symbols and control symbols, respectively. The transmit processor 220 may also generate reference symbols, such as for a primary synchronization signal (PSS), a secondary synchronization signal (SSS), and a physical broadcast channel (PBCH) demodulation reference signal (DMRS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a-232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. The downlink signals from the MODs 232a-232t may be transmitted via antennas 234a-234t, respectively.

At the UE 120, antennas 252a-252r may receive the downlink signals from the BS 110 and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for a physical uplink shared channel (PUSCH)) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a TX MIMO processor 266 if applicable, further processed by the DEMODs in transceivers 254a-254r (e.g., for SC-FDM, etc.), and transmitted to the BS 110. At the BS 110, the uplink signals from the UE 120 may be received by the antennas 234, processed by the MODs 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

Memories 242 and 282 may store data and program codes for the BS 110 and the UE 120, respectively. A scheduler 244 may schedule the UEs for 120 data transmission on a downlink and/or an uplink.

The controller/processor 280 and/or other processors and modules at the UE 120 may perform or direct the execution of processes for techniques described herein. For example, as shown in FIG. 2, the controller/processor 280 of the UE 120 has a resource manager 281 that determines whether any resource reservations for sidelink communications are available to be reclaimed for other transmissions, according to aspects described herein. Although shown at the Controller/Processor, other components of the UE 120 and the BS 110 may be used to perform the operations described herein. While the examples provided herein are described with respect to a BS communicating with a UE, aspects of the present disclosure may also be applied to a UE communicating with another UE such as the UE 120a communicating with the UE 120b via sidelink transmissions as depicted in FIG. 1.

Figure 3:
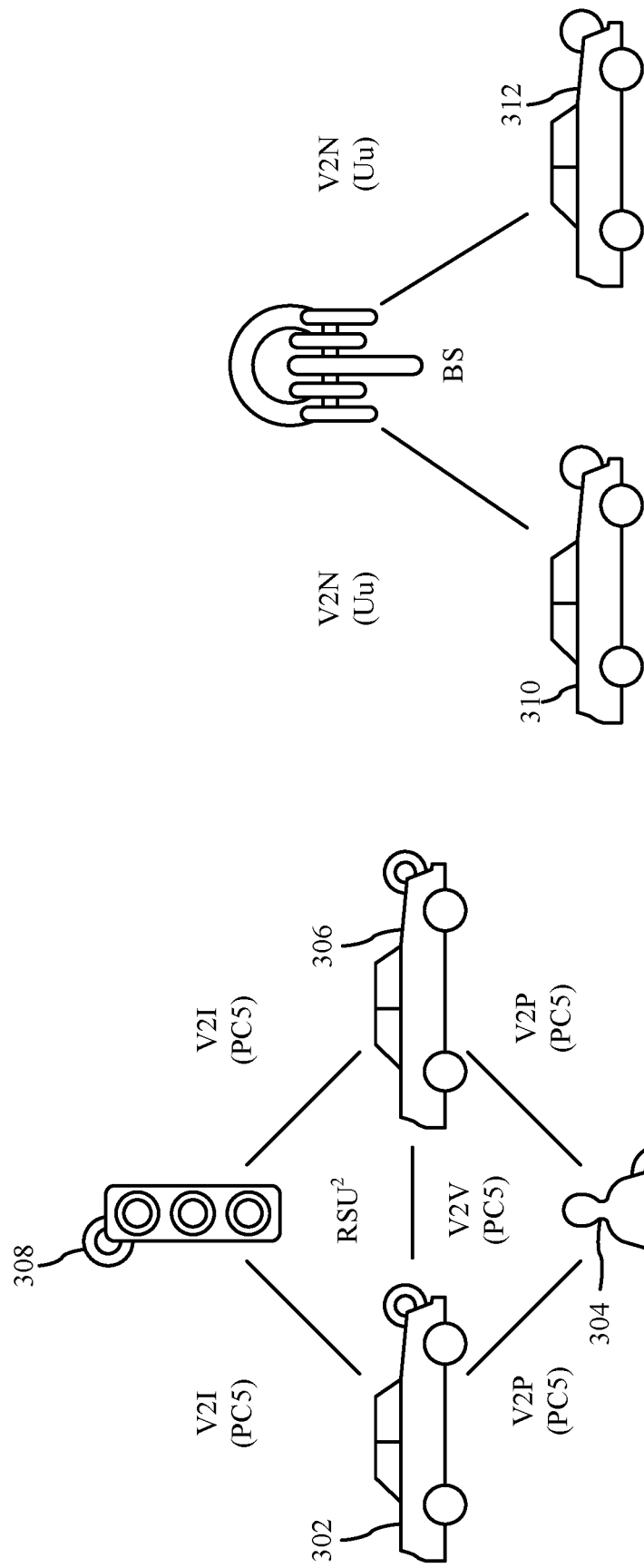
FIGS. 3A and 3B illustrate vehicle to everything (V2X) systems, in accordance with certain aspects of the present disclosure.

FIGS. 3A and 3B illustrate vehicle to everything (V2X) systems, in accordance with certain aspects of the present disclosure. The V2X systems, provided in FIGS. 3A and 3B provides two complementary transmission modes. A first transmission mode involves direct communications (e.g., also referred to herein as sidelink communications between UEs) between participants in the local area. Such communications are illustrated in FIG. 3A. A second transmission mode involves network communications through a network as illustrated in FIG. 3B, which may be implemented over a Uu interface (e.g., a wireless communication interface between a radio access network (RAN) and a UE).

Referring to FIG. 3A, a V2X system is illustrated with two vehicles. The first transmission mode allows for direct communication between different participants in a given geographic location. As illustrated, a first vehicle 302 can have a wireless communication link with an individual 304 (V2P) (e.g., via a UE) through a PC5 interface. Communications between the first vehicle 302 and a second vehicle 306 (V2V) may also occur through a PC5 interface. In a like manner, communication may occur from the first vehicle 302 to other highway components, such as a traffic signal 308 or sign (V2I) through a PC5 interface. In each example illustrated, two-way communication may take place between elements, therefore each element may be a transmitter and a receiver of information. In the configuration provided, the first transmission mode is a self-managed system and no network assistance is provided. Such transmission modes may enable improved spectral efficiency, reduced cost, and increased reliability as network service interruptions do not occur during handover operations for moving vehicles. Resource assignments do not need coordination between operators and subscription to a network is not necessary, therefore there is reduced complexity for such self-managed systems. The V2X system may be configured to operate in a licensed or unlicensed spectrum, thus any vehicle with an equipped system may access a common frequency and share information. Such harmonized/common spectrum operations allows for safe operation. The V2X system Referring to FIG. 3B, a second of two complementary transmission modes is illustrated. In the illustrated embodiment, a vehicle 310 may communicate to another vehicle 312 through network communications. These network communications may occur through discrete nodes, such as a BS (e.g., an eNB or gNB), that send and receive information between vehicles. The network communications may be used, for example, for long range communications between the vehicles (310, 312), such as noting the presence of an accident approximately 1 mile ahead. Other types of communication may be sent by the node to the vehicles (310, 312), such as traffic flow conditions, road hazard warnings, environmental/weather reports, service station availability and other like data. Such data can be obtained from cloud-based sharing services.

Example of Reclaiming Reservations in Sidelink Communications

In certain wireless communication systems (e.g., 5G NR), a UE may signal to another UE sidelink control information (SCI) that includes resource (e.g., frequency-domain resources and/or time-domain resources) reservations for sidelink communications. In certain cases, the UE may broadcast the SCI to multiple UEs to enable some of the UEs to refrain from communicating during the resource reservations. As used herein, a resource reservation for sidelink communications may refer to a selection of resources (time resources and/or frequency resources) for one or more transmissions to one or more UEs. In aspects, the resource reservation may indicate a frequency resource assignment, a time resource assignment, and/or a resource reservation period. The frequency resource assignment may include one or more frequency resources for the transmissions to one or more UEs, and the resource allocation unit in the frequency domain may be in terms of one or more resource blocks, one or more bandwidth part (BWPs) in a carrier, or one or more sub-channels in a BWP or carrier. The time resource assignment may include one or more time-domain resources for the transmission to one or more UEs, and the resource allocation unit in the time domain may be in terms of symbols, mini-slots, slots, etc. The resource reservation period may provide a periodicity with which the frequency-time resources are assigned/reserved, for example, a length of the period (e.g., in milliseconds) and a total number of periods for future transmission occasions.

The resource reservations may be for a transmission of a transport block (TB) or a retransmission of the same TB. A single SCI may include a maximum number of reservations (such as 2, 3, or 4 resource reservations), which may be a preconfigured value or configurable via control signaling (e.g., radio resource control (RRC) signaling) from a base station (e.g., BS 110a).

In sidelink communications, retransmissions may be feedback-based or non-feedback based. In aspects, retransmissions may be transmitted by a UE (a transmitting UE) based on feedback (e.g., hybrid automatic repeat request (HARQ) feedback) from another UE (a receiving UE). For example, if a transmitting UE fails to receive an acknowledgement message from a receiving UE, the transmitting UE may resend the transmission based on various HARQ operations (such as forward error correction). In other aspects, the transmitting UE may blindly resend transmissions without any feedback from the receiving UE.

In feedback-based retransmission schemes, other UEs may determine based on the feedback whether resources reserved for retransmissions may be reclaimed (e.g., used for other transmissions). In other words, other UEs may listen to the feedback channel to determine whether a resource is released or not. For instance, suppose a transmitting UE reserves resources for three transmissions to send data to a receiving UE, where the first resource reservations carries the data and the subsequent resource reservations are reserved for retransmissions in case of decoding failures encountered at the receiving UE. If the receiving UE indicates, via broadcasted feedback, that the receiving UE has successfully decoded the data via the first resource reservation, the remaining resource reservations may be reclaimed for other transmissions, for example, by the other UEs monitoring the feedback. As used herein, reclaiming a resource reservation may include communicating with a base station or UE during the reclaimed resource reservation.

It may be spectrally and time-domain inefficient to refrain from reclaiming resource reservations. For example, if the number of reservations per SCI is large (e.g., ≥3 or 4 resource reservations), many resources may be wasted if reserved resources are not reclaimed. Monitoring all feedback from the receiving UE may be an inefficient method (in terms of power consumption, frequency resources, and time resources) of determining whether resources are available for reclaiming for other transmissions. As a UE is already monitoring control channels, the UE would also have to monitor all the feedback channels of nearby UEs, which may increase the power consumption of the UE and/or reduce the processing capabilities of the UE Aspects of the present disclosure provide various techniques for reclaiming one or more resource reserved for sidelink transmissions. The techniques described herein may provide an efficient method of determining whether resource reservations for sidelink transmission are available for reclaiming for other transmissions such as other sidelink transmissions or Uu transmissions. For instance, the techniques described herein may enable reclaiming of reserved resources without having UEs monitor all feedback transmissions (e.g., on the PSFCH). In certain aspects, if the maximum number of reservations per SCI is configured (or preconfigured) above a threshold, a UE may be enabled to reclaim reservations regardless of whether the reserved resources are available for reclaiming. In other aspects, if a transmitting UE (e.g., the UE that originally reserved resources for sidelink communications) determines to release reservations, the transmitting UE may signal that the reservations are released when transmitting SCI at the next reserved transmission. In other aspects, aside from releasing resources, the transmitting UE may indicate the number of valid reservations in the SCI regardless of whether reservations are reclaimed or not.

Figure 4:
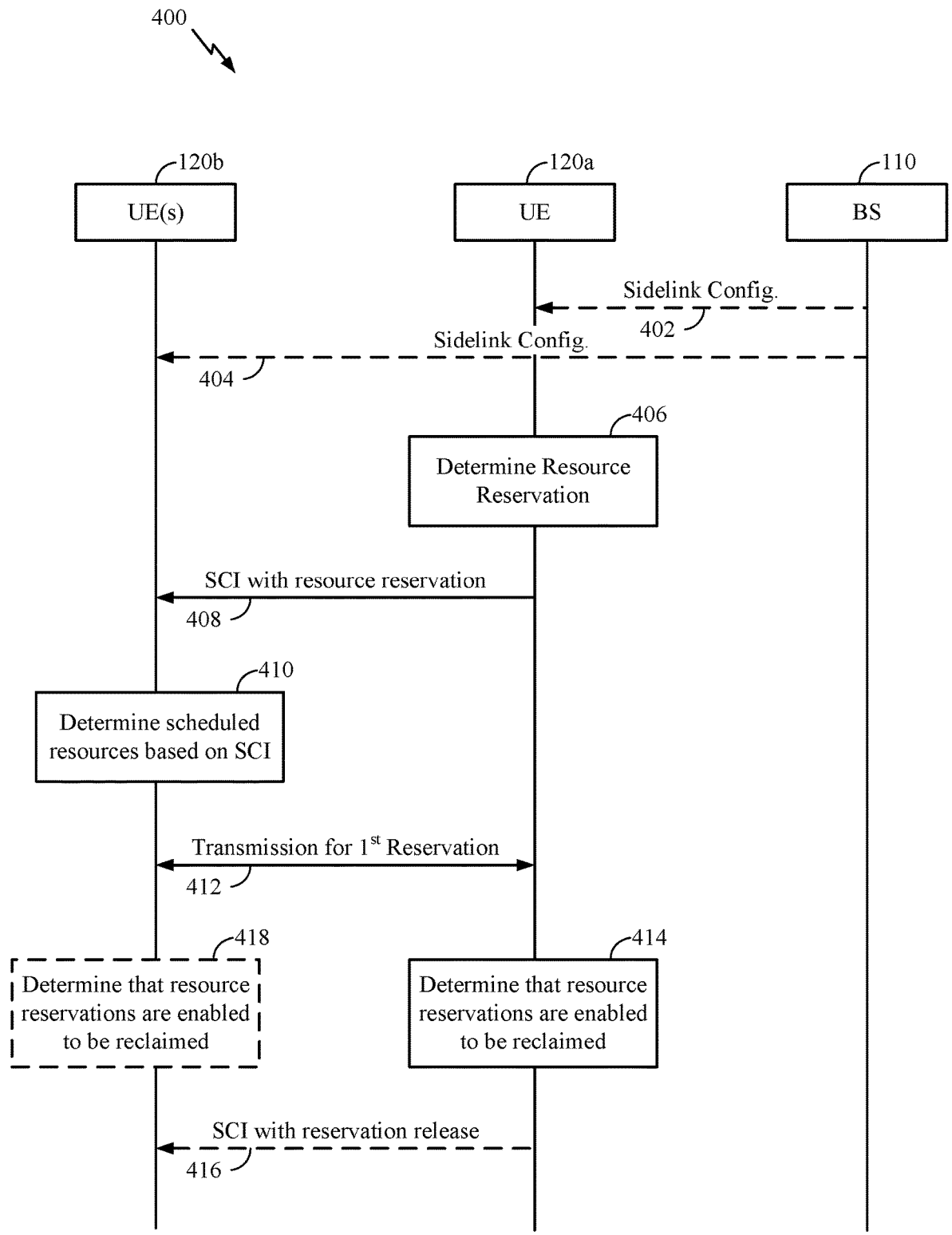
FIG. 4 is a call flow diagram illustrating example operations for managing resource reservations for sidelink communications, in accordance with certain aspects of the present disclosure.

FIG. 4 is a call flow diagram illustrating example operations 400 for reclaiming resources reserved for sidelink communications, in accordance with certain aspects of the present disclosure. As shown at 402 and 404, a B S 110 may transmit control signaling (e.g., RRC signaling) to a first UE 120a and a second UE 120b, respectively. The control signaling may include a configuration that indicates a threshold value that may determine whether resource reservations are enabled for reclaiming, as further described herein. In other aspects, the UEs 120a, 120b may be preconfigured with the threshold value, such as having the threshold value stored in memory.

At 406, the first UE 120a may determine resource reservations allocated for sidelink communications with the second UE 120b. At 408, the first UE 120a may transmit, to the second UE 120b, control information (e.g., SCI) having an indication of the resource reservations. For example, the resource reservations may include resources for an initial transmission (associated with a first resource reservation) at slot X and subsequent feedback based retransmissions (each associated with subsequent resource reservations) at slots X+5, X+10, and X+16.

At 410, the second UE 120b may determine time and frequency resource allocations for communicating with the first UE 120a based on the indication of the resource reservations. At 412, the second UE 120b may communicate with the first UE 120a based on the determination of the time and frequency resource allocations with respect to the first resource reservation in the SCI.

At 414, the first UE 120a may determine that a remaining set of the resource reservations is enabled to be reclaimed by one or more UEs including the first UE 120a, the second UE 120b, and/or other UEs. Upon making this determination, the first UE 120a may refrain from communicating with the second UE 120b during one or more resource reservations within the remaining set of the resource reservations; or the first UE 120a may communicate with one or more other UEs during one or more resource reservations within the remaining set of the resource reservations.

Alternatively, or additionally, at 416, the first UE 120a may determine that a remaining set of the resource reservations is enabled to be reclaimed by one or more UEs including the first UE 120a, the second UE 120b, and/or other UEs. In certain aspects, other UEs may also receive the second SCI message, for example, via a sidelink control channel such as the PSCCH. The SCI that signals a reservation release may enable the UEs (including the first UE 120a, the second UE 120b, and/or other UEs) to use the resources reserved for transmissions between the first UE 120a and the second UE 120b for other transmissions.

Alternatively, or additionally, at 418, the second UE 120a may determine that a remaining set of the resource reservations is enabled to be reclaimed by one or more UEs including the first UE 120a, the second UE 120b, and/or other UEs. Upon making this determination, the second UE 120b may refrain from communicating with the first UE 120a during one or more resource reservations within the remaining set of the resource reservations; or the second UE 120b may communicate with one or more other UEs during one or more resource reservations within the remaining set of the resource reservations.

In certain aspects, the SCI transmitted at 408 and/or 416 may have an indication of a number of valid resource reservations. For example, the SCI may have a payload size sufficient to indicate four resource reservations, but the SCI only provides two valid resource reservations and indicates that the remaining resource reservations in the SCI are invalid. As used herein, a valid resource reservation may include a resource that is scheduled for communications and may be implemented, while an invalid resource reservation may include a resource that is not scheduled for communications and may be ignored.

While the examples provided herein are described with respect to the first UE 120a communicating with the second UE 120b, aspects of the present disclosure may also be applied to the first UE 120a communicating with multiple second UEs 120b via multicast and/or broadcast sidelink communications.

Figure 5:
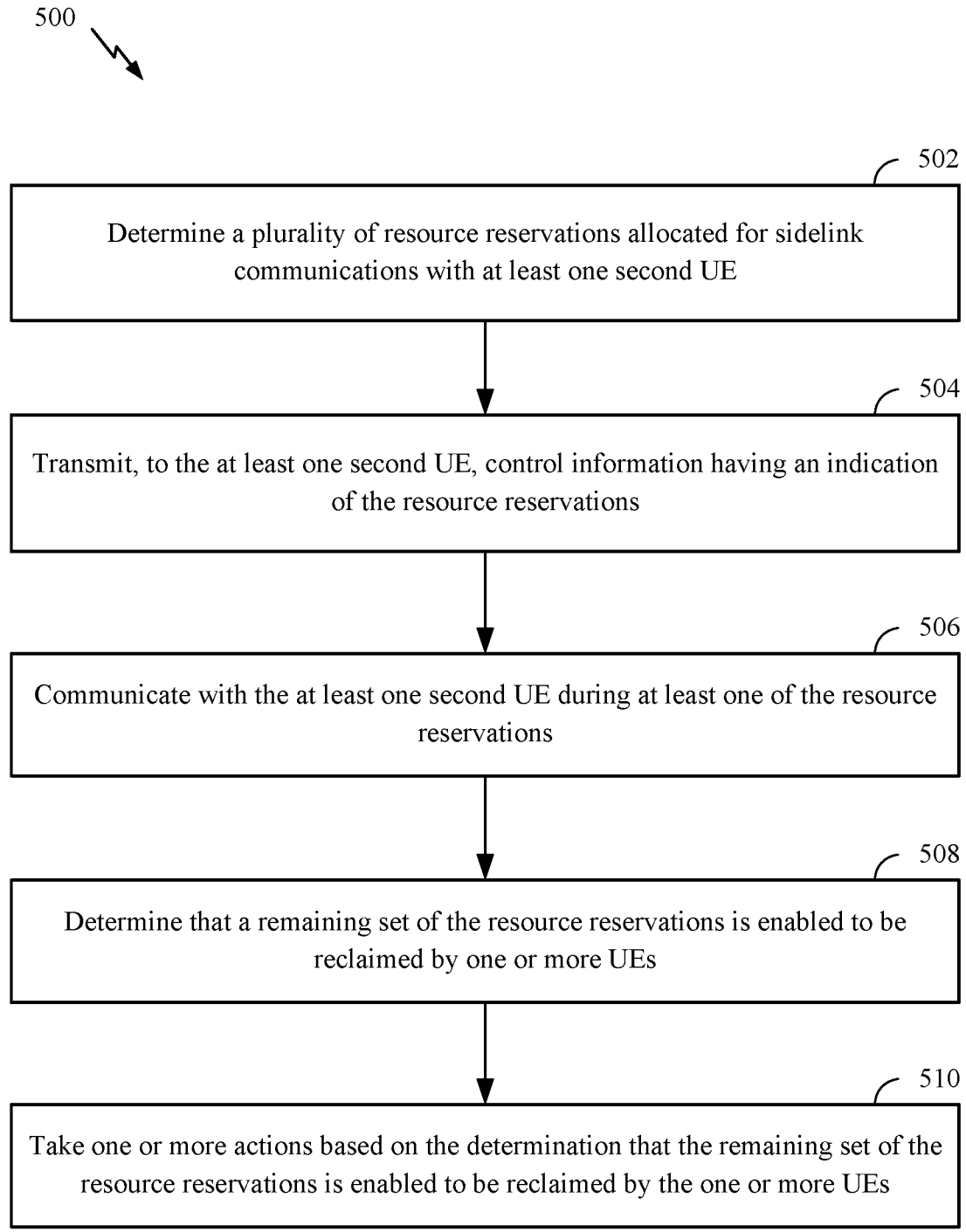
FIG. 5 is a flow diagram illustrating example operations for wireless communications by a first UE, in accordance with certain aspects of the present disclosure.

FIG. 5 is a flow diagram illustrating example operations 500 for wireless communication, in accordance with certain aspects of the present disclosure. The operations 500 may be performed, for example, by a user equipment (e.g., the UE 120a in the wireless communication network 100). The operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at 502, where a first UE (e.g., the first UE 120a) may determine a plurality of resource reservations allocated for sidelink communications with at least one second UE (e.g., one or more second UEs 120b). At 504, the first UE may transmit, to the at least one second UE, control information (e.g., SCI) having an indication of the resource reservations. At 506, the first UE may communicate with the at least one second UE during at least one of the resource reservations. At 508, the first UE may determine that a remaining set of the resource reservations is enabled to be reclaimed by one or more UEs. At 510, the first UE may take one or more actions based on the determination that the remaining set of the resource reservations is enabled to be reclaimed by the one or more UEs.

In certain aspects, at 506, the first UE may communicate with the second UE, for example, by transmitting data transmissions to the second UE in accordance with the resource reservations (e.g., at the scheduled time-domain resources and with the allocated frequency-domain resources). In other aspects, the first UE may communicate with the second UE by receiving data transmissions from the second UE in accordance with the resource reservations. In certain aspects, the resource reservations may reserve resources for feedback-based retransmissions or non-feedback based retransmissions. In other aspects, the determination of reclaiming resources may depend on the resource reservations reserving resources for feedback based retransmissions. That is, resource reservations that reserve resources for non-feedback based retransmissions may not be available for reclaiming.

In aspects, taking one or more actions at 510 may include the first UE refraining from communicating with the at least one second UE during one or more resource reservations within the remaining set of the resource reservations. In other aspects, taking one or more actions at 510 may include the first UE communicating with another UE during one or more resource reservations within the remaining set of the resource reservations.

In certain aspects, the determination of reclaiming at 508 may be based on various conditions, and in some cases, regardless of whether the resource reservations are actually available for reclaiming. For instance, if a maximum number of reservations per SCI is configured (or preconfigured) above a threshold (e.g., 3 or 4), a UE may be enabled to reclaim reservations regardless of whether the reserved resources are actually available for other communications. As an example, if the SCI has a maximum of three or four reservations, the UE may enable reclaiming of reservations by other UEs. Otherwise, if the SCI has a maximum of two reservations, the UE may not enable reclaiming of reservations by other UEs.

As another example, the first UE may determine that the remaining set of the resource reservations is enabled to be reclaimed based on a threshold value associated with the resource reservations. In aspects, if a total number of the resource reservations in the control information is greater than (or equal to) the threshold value (e.g., 3 or 4), the first UE may determine that the remaining set of the resource reservations is enabled to be reclaimed. In other aspects, if a total number of the resource reservations in the control information is less than (or equal to) the threshold value, the first UE may determine that the remaining set of the resource reservations is enabled to be reclaimed.

In other aspects, if a transmitting UE (e.g., the UE that originally reserved resources for sidelink communications) determines to release reservations, the transmitting UE may signal that the reservations are released when transmitting SCI at the next reserved transmission. As an example, suppose the transmitting UE reserves transmissions at slots X, X+5, X+10, and X+16, the transmitting UE sends an initial transmission at Slot X. After the initial transmission, the transmitting UE determines from feedback that reserved resources scheduled for the retransmissions can be reclaimed. In the reserved resources in slot X+5, the transmitting UE indicates that the remaining reservations in slots X+10 and X+16 are released for other transmissions. Other UEs may now determine whether the reservations are released or not based on monitoring SCI without having to continuously monitor the feedback channel.

In aspects, upon determining that the remaining set of the resource reservations is enabled to be reclaimed, the first UE may transmit another SCI message that indicates one or more resource reservations within the remaining set of the resource reservations are released from being reserved for communications with the first UE. That is, taking one or more actions at 510 may include transmitting, to the at least one second UE, additional control information (e.g., a second SCI message) indicating that one or more resource reservations within the remaining set of the resource reservations are released from being reserved for communications between the first UE and the at least one second UE.

According to certain aspects, the indication that the reserved resources are released for other communications may be explicitly or implicitly indicated in the SCI. For instance, the SCI may provide explicit signaling via a dedicated field. In aspects, the additional control information includes a field (e.g., a bit flag) indicating that the one or more resource reservations within the remaining set of the resource reservations are released.

In other aspects, the SCI may only reserve resources for the PSSCH associated with the current PSCCH on which the SCI is transmitted. In other words, the SCI may provide a resource reservation for a single PSSCH associated with the PSCCH that carried the SCI at one of the remaining resource reservation enabled for reclaiming. For instance, the first UE may transmit the additional control information within a time-domain resource (e.g., a slot, mini-slot, etc.) associated with a resource reservation following the at least one resource reservation and within the remaining set of the resource reservations with respect to operations 500. The additional control information may indicate that a single resource reservation is reserved for communications between the first UE and the at least one second UE.

In aspects, the reserved resources may be indicated as being released by indicating the resource reservations as being unused or invalid. For example, the SCI may indicate that all or some of the resource reservations in the SCI are invalid. As an example, the additional control information may indicate a number of valid resource reservations in the additional control information, and the one or more resource reservations within the remaining set of the resource reservations may include invalid resource reservations in the additional control information.

Aside from releasing resources, the transmitter UE may signal the number of valid reservations in the SCI and/or indicate whether a reservation is valid or invalid. For example, the control information of operations 500 may indicate a number of valid resource reservations in the control information, and the valid resource reservations may include the resource reservations determined at 502. In certain aspects, a certain value (e.g. all zeroes) of a reservation field may indicate that the reservation field does not correspond to a valid resource reservation (e.g., an invalid resource reservation). For example, the control information of operations 500 may include a plurality of reservation fields, each of the reservations fields is associated with a resource reservation, and at least one of the reservation fields has a value that indicates the resource reservation associated with the reservation field is invalid.

In other aspects, a field in the SCI may indicate the number of valid reservations in the SCI. As an example, the valid reservation fields may be sequential starting from the first reservation field in the SCI, and the field may provide the length of the valid reservations in the sequence of the reservation fields of the SCI. The reservation fields that do not correspond to valid reservations (e.g., invalid resource reservations) may be repurposed for other communications. With respect to operations 500, the control information may include a sequence of reservation fields, each of the reservation fields is associated with a resource reservation, and the control information may include a field that indicates a segment of the reservations fields (a first segment or last segment) in the sequence is associated with the valid resource reservations. The field may provide the length of the segment of reservation fields. In other words, the field may be a number indicating a length of the segment of the reservation fields in the sequence. The segment of the reservation fields associated with valid resource reservations may include the first or last resource reservation in the sequence.

In certain aspects, a bitmap field in the SCI may indicate which reservation fields correspond to valid reservations. The reservation fields that do not correspond to valid reservations (e.g., invalid resource reservations) may be repurposed for other communications. With respect to operations 500, the control information may include a bitmap having a plurality of bits, each of the bits of the bitmap corresponds to a resource reservation in the control information, and at least one of the bits indicates the resource reservation associated with the bit is invalid. In other aspects, a bit flag may be associated with each reservation field, and the flag may indicate whether that particular reservation is valid or invalid.

Figure 6:
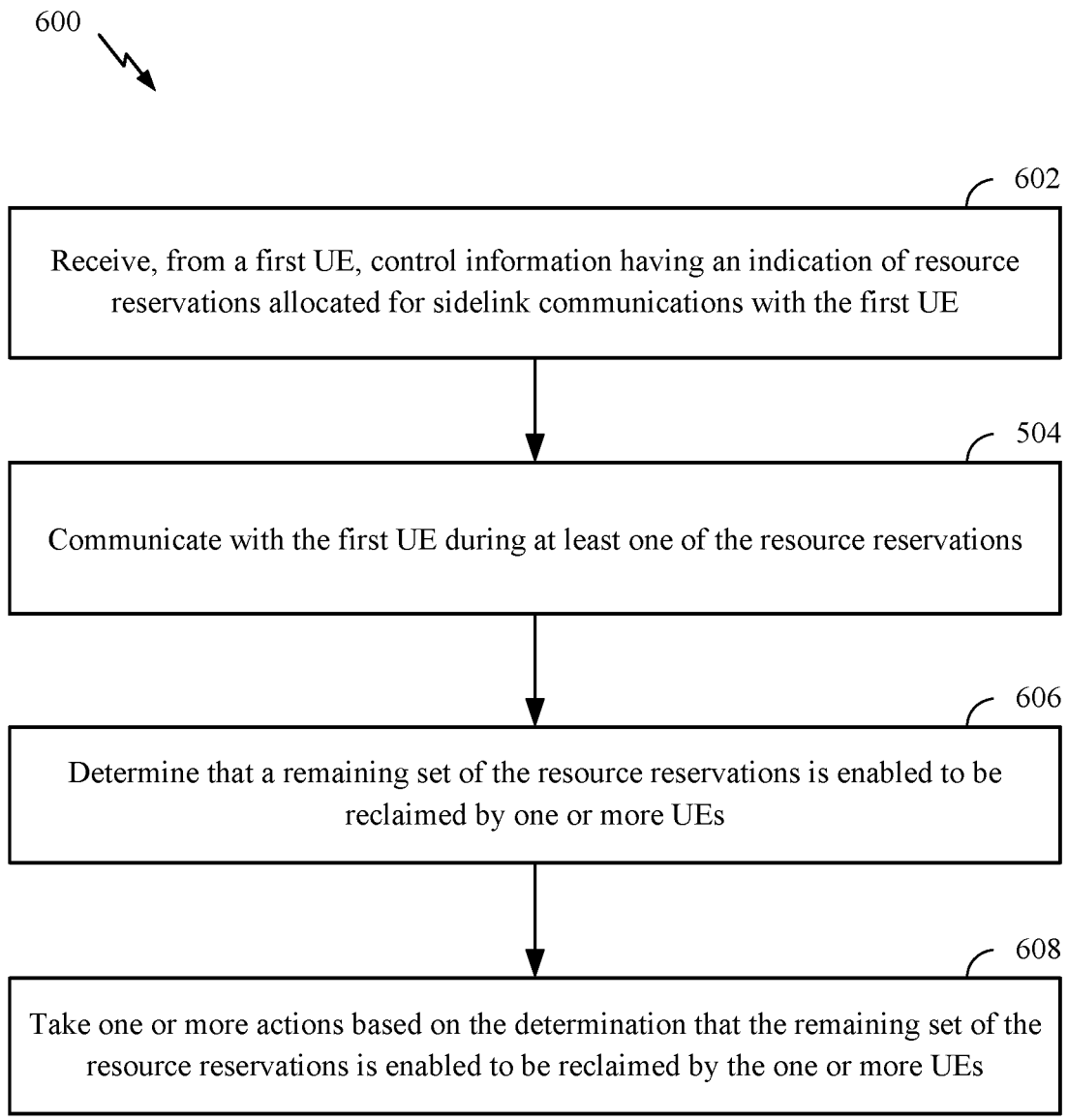
FIG. 6 is a flow diagram illustrating example operations for wireless communications by a second UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., the UE 120*b* in the wireless communication network 100). The operations 600 may be complimentary to the operations 500 performed by another UE. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 602, where a second UE (e.g., the second UE 120*b*) may receive, from a first UE (e.g., the first UE 120*a*), control information (e.g., SCI) having an indication of resource reservations allocated for sidelink communications with the first UE. At 604, the second UE may communicate with the first UE during at least one of the resource reservations. At 606, the second UE may determine that a remaining set of the resource reservations is enabled to be reclaimed by one or more UEs. At 608, the second UE may take one or more actions based on the determination that the remaining set of the resource reservations is enabled to be reclaimed by the one or more UEs.

In certain aspects, at 606, the second UE may communicate with the first UE, for example, by transmitting data to the first UE in accordance with the resource reservations (e.g., at the scheduled time-domain resources and with the allocated frequency-domain resources). In other aspects, at 606, the second UE may communicate with the first UE by receiving data transmissions from the second UE in accordance with the resource reservations. In aspects, the second UE may communicate with the first UE by monitoring a control channel at time-domain resources associated with the resource reservations. In some cases, the second UE may not be the target of the resource reservations for the data transmissions, but instead the second UE monitors the control channel for the control information described herein to determine when resource reservations are enabled to be reclaimed or released without having to monitor a feedback channel. In certain aspects, the resource reservations may reserve resources for feedback-based retransmissions or non-feedback based retransmissions. In other aspects, the determination of reclaiming resources may depend on the resource reservations reserving resources for feedback based retransmissions. That is, resource reservations that reserve resources for non-feedback based retransmissions may not be available for reclaiming.

In aspects, taking one or more actions at 608 may include the second UE refraining from communicating with the first UE during one or more resource reservations within the remaining set of the resource reservations. In other aspects, taking one or more actions at 608 may include the second UE communicating with another UE during one or more resource reservations within the remaining set of the resource reservations.

In certain aspects, the determination of reclaiming at 606 may be based on various conditions, and in some cases, regardless of whether the resource reservations are actually available for reclaiming. For instance, if a maximum number of reservations per SCI is configured (or preconfigured) above a threshold (e.g., 3 or 4), a UE may be enabled to reclaim reservations regardless of whether the reserved resources are actually available for other communications. As an example, if the SCI has a maximum of three or four reservations, the UE may enable reclaiming of reservations by other UEs. Otherwise, if the SCI has a maximum of two reservations, the UE may not enable reclaiming of reservations by other UEs.

As another example, the second UE may determine that the remaining set of the resource reservations is enabled to be reclaimed based on a threshold value associated with the resource reservations. In aspects, if a total number of the resource reservations in the control information is greater than (or equal to) the threshold value (e.g., 3 or 4), the second UE may determine that the remaining set of the resource reservations is enabled to be reclaimed. In other aspects, if a total number of the resource reservations in the control information is less than (or equal to) the threshold value, the second UE may determine that the remaining set of the resource reservations is enabled to be reclaimed.

In aspects, upon determining that the remaining set of the resource reservations is enabled to be reclaimed, the second UE may receive another SCI message that indicates one or more resource reservations within the remaining set of the resource reservations are released from being reserved for communications with the first UE. With respect to operations 600, the second UE may receive, from the first UE, additional control information indicating that one or more resources within the remaining set of the resource reservations are released from being reserved for communications with the first UE (e.g., including communications between the first UE and second UE or between the first UE and another UE). Based on the indication, at 606, the second UE may determine that the remaining set of the resources is enabled to be reclaimed as the reservations are released. Expressed another way, the determination of reclaiming at 606 may be based on the reception of an indication that one or more resource reservations within the remaining set of the resource reservations are released from being reserved for communications with the first UE.

According to certain aspects, the indication that the reserved resources are released for other communications may be explicitly or implicitly indicated in the SCI. For instance, the SCI may provide explicit signaling via a dedicated field. In aspects, the additional control information includes a field (e.g., a bit flag) indicating that the one or more resource reservations within the remaining set of the resource reservations are released.

In other aspects, the SCI may only reserve resources for the PSSCH associated with the current PSCCH on which the SCI is transmitted. In other words, the SCI may provide a resource reservation for a single PSSCH associated with the PSCCH that carried the SCI at one of the remaining resource reservation enabled for reclaiming.

For instance with respect to operations 600, the second UE may receive the additional control information within a time-domain resource (e.g., a slot, mini-slot, etc.) associated with a resource reservation following the at least one resource reservation and within the remaining set of the resource reservations transmit the additional control information within a time-domain resource associated with a resource reservation following the at least one resource reservation and within the remaining set of the resource reservations. The additional control information may indicate that a single resource reservation is reserved for communications with the first UE (e.g., including communications between the first UE and second UE or between the first UE and another UE).

In aspects, the reserved resources may be indicated as being released by indicating the resource reservations as being unused or invalid. For example, the SCI may indicate that all or some of the resource reservations in the SCI are invalid. As an example with respect to operations 600, the additional control information may indicate a number of valid resource reservations in the additional control information, and the one or more resource reservations within the remaining set of the resource reservations may include invalid resource reservations in the additional control information.

According to certain aspects, the receiver UE may receive the number of valid reservations in the SCI and/or an indication of whether a reservation is valid or invalid. For example, the control information of operations 600 may indicate a number of valid resource reservations in the control information, and the valid resource reservations may include the resource reservations received at 602. In certain aspects, a certain value (e.g. all zeroes) of a reservation field may indicate that the reservation field does not correspond to a valid resource reservation (e.g., an invalid resource reservation). For example, the control information of operations 600 may include a plurality of reservation fields, each of the reservations fields is associated with a resource reservation, and at least one of the reservation fields has a value that indicates the resource reservation associated with the reservation field is invalid.

In other aspects, a field in the SCI may indicate the number of valid reservations in the SCI. As an example, the valid reservation fields may be sequential starting from the first reservation field in the SCI, and the field may provide the length of the valid reservations in the sequence of the reservation fields of the SCI. The reservation fields that do not correspond to valid reservations (e.g., invalid resource reservations) may be repurposed for other communications. With respect to operations 600, the control information may include a sequence of reservation fields, each of the reservation fields is associated with a resource reservation, and the control information may include a field that indicates a segment of the reservations fields (a first segment or last segment) in the sequence is associated with the valid resource reservations. The field may provide the length of the segment of reservation fields. In other words, the field may be a number indicating a length of the segment of the reservation fields in the sequence. The segment of the reservation fields associated with valid resource reservations may include the first or last resource reservation in the sequence.

In certain aspects, a bitmap field in the SCI may indicate which reservation fields correspond to valid reservations. The reservation fields that do not correspond to valid reservations (e.g., invalid resource reservations) may be repurposed for other communications. With respect to operations 600, the control information may include a bitmap having a plurality of bits, each of the bits of the bitmap corresponds to a resource reservation in the control information, and at least one of the bits indicates the resource reservation associated with the bit is invalid. In other aspects, a bit flag may be associated with each reservation field, and the flag may indicate whether that particular reservation is valid or invalid.

Figure 7:
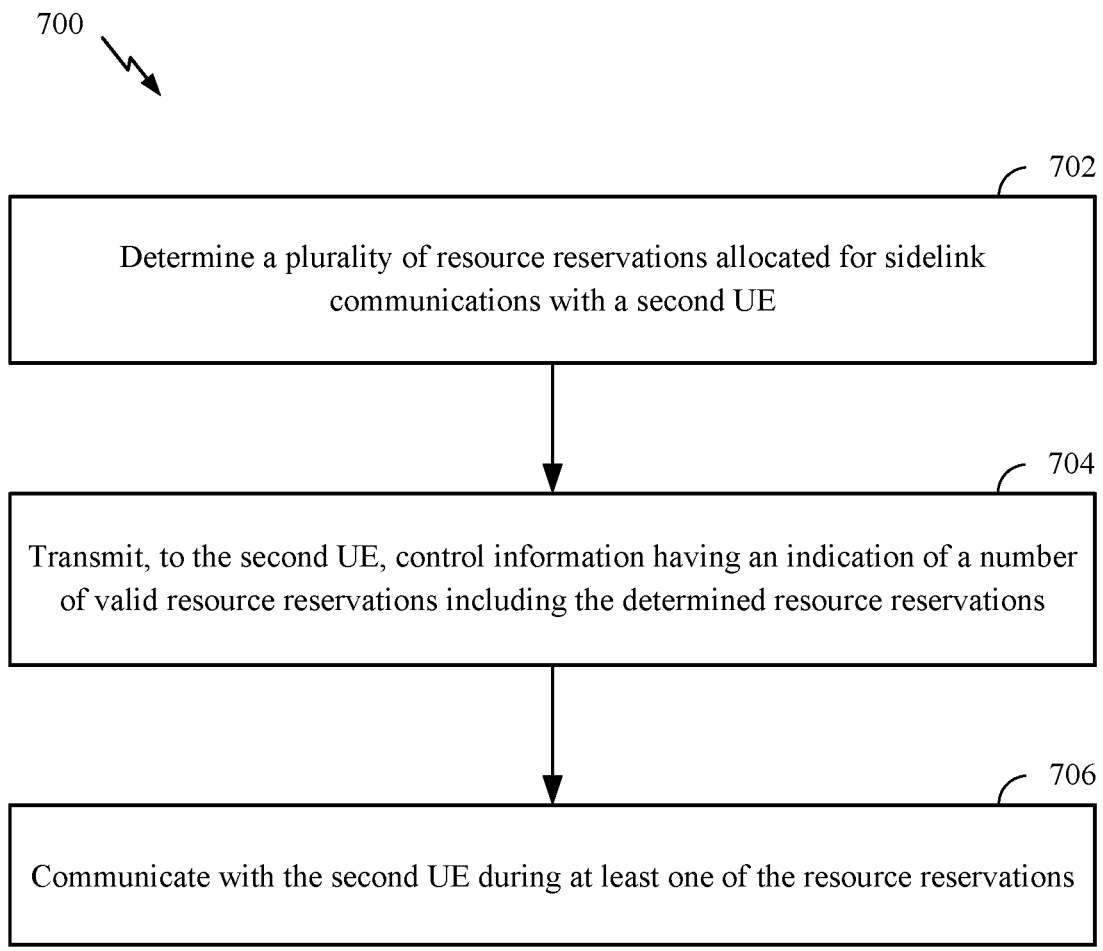
FIG. 7 is a flow diagram illustrating other example operations for wireless communications by a first UE, in accordance with certain aspects of the present disclosure.

FIG. 7 is a flow diagram illustrating example operations 700 for wireless communication, in accordance with certain aspects of the present disclosure. The operations 700 may be performed, for example, by a user equipment (e.g., the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 702, where a first UE (e.g., UE 120a) may determine a plurality of resource reservations allocated for sidelink communications with a second UE (e.g., UE 120b). At 704, the first UE may transmit, to the second UE, control information (e.g., SCI) having an indication of a number of valid resource reservations including the determined resource reservations. At 706, the first UE may communicate with the second UE during at least one of the resource reservations.

In certain aspects, at 506, the first UE may communicate with the second UE, for example, by transmitting data transmissions to the second UE in accordance with the resource reservations (e.g., at the scheduled time-domain resources and with the allocated frequency-domain resources). In other aspects, the first UE may communicate with the second UE by receiving data transmissions from the second UE in accordance with the resource reservations.

According to certain aspects, the transmitter UE may signal the number of valid reservations in the SCI and/or indicate whether a reservation is valid or invalid. For example with respect to operations 700, the control information may indicate a number of valid resource reservations in the control information, and the valid resource reservations may include the resource reservations determined at 702. In certain aspects, a certain value (e.g. all zeroes) of a reservation field may indicate that the reservation field does not correspond to a valid resource reservation (e.g., an invalid resource reservation). For example, the control information may include a plurality of reservation fields, each of the reservations fields is associated with a resource reservation, and at least one of the reservation fields has a value that indicates the resource reservation associated with the reservation field is invalid.

In other aspects, a field in the SCI may indicate the number of valid reservations in the SCI. As an example, the valid reservation fields may be sequential starting from the first reservation field in the SCI, and the field may provide the length of the valid reservations in the sequence of the reservation fields of the SCI. The reservation fields that do not correspond to valid reservations (e.g., invalid resource reservations) may be repurposed for other communications. With respect to operations 700, the control information may include a sequence of reservation fields, each of the reservation fields is associated with a resource reservation, and the control information may include a field that indicates a segment of the reservations fields (a first segment or last segment) in the sequence is associated with the valid resource reservations. The field may provide the length of the segment of reservation fields. In other words, the field may be a number indicating a length of the segment of the reservation fields in the sequence. The segment of the reservation fields associated with valid resource reservations may include the first or last resource reservation in the sequence.

In certain aspects, a bitmap field in the SCI may indicate which reservation fields correspond to valid reservations. The reservation fields that do not correspond to valid reservations (e.g., invalid resource reservations) may be repurposed for other communications. With respect to operations 700, the control information may include a bitmap having a plurality of bits, each of the bits of the bitmap corresponds to a resource reservation in the control information, and at least one of the bits indicates the resource reservation associated with the bit is invalid. In other aspects, a bit flag may be associated with each reservation field, and the flag may indicate whether that particular reservation is valid or invalid.

Figure 8:
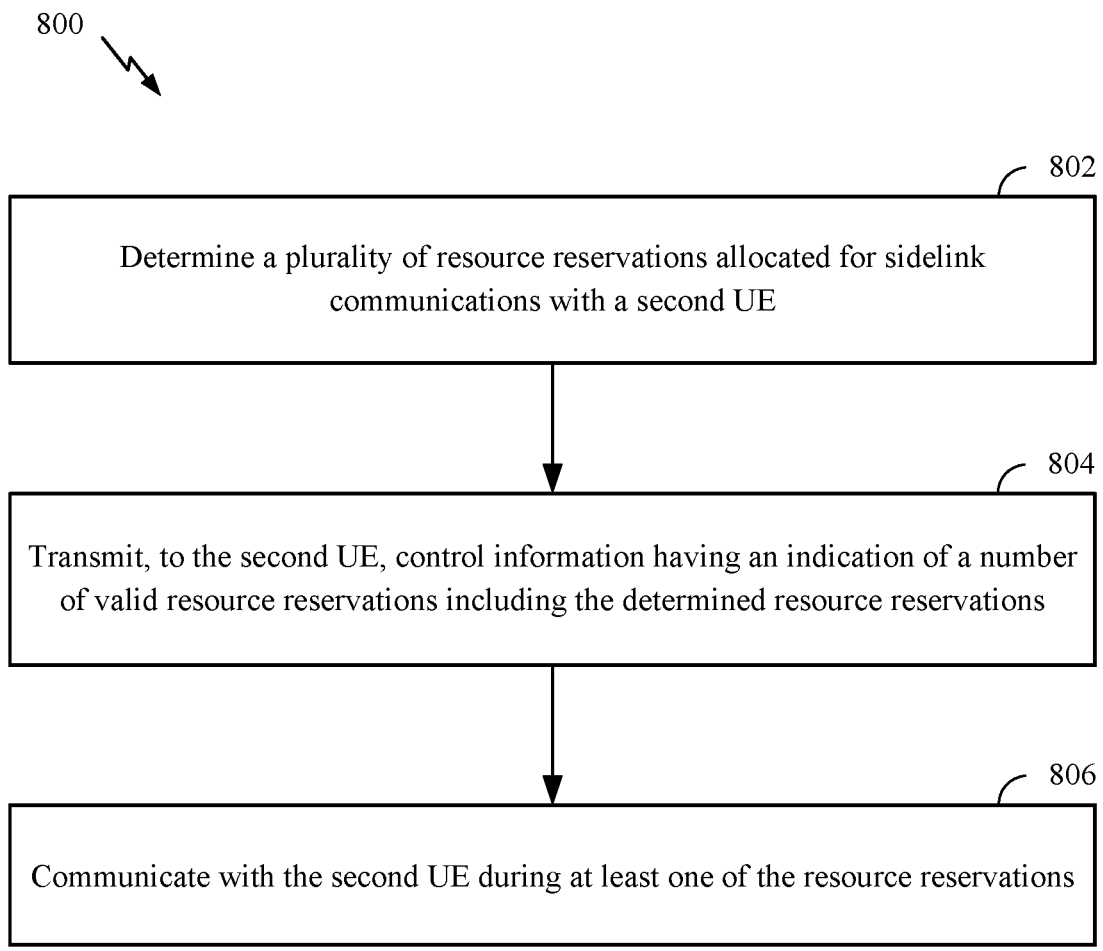
FIG. 8 is a flow diagram illustrating other example operations for wireless communications by a second UE, in accordance with certain aspects of the present disclosure.

FIG. 8 is a flow diagram illustrating example operations 800 for wireless communication, in accordance with certain aspects of the present disclosure. The operations 800 may be performed, for example, by a UE (e.g., the UE 120b in the wireless communication network 100). The operations 800 may be complimentary to the operations 700 performed by another UE. Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at 802, where a second UE (e.g., UE 120b) may receive, from a first UE (e.g., UE 120a), control information (e.g., SCI) having an indication of a number of valid resource reservations allocated for sidelink communications with the first UE. At 804, the second UE may determine time and frequency resource allocations for communicating with the first UE based on the indication of the valid resource reservations. At 806, the second UE may communicate with the first UE based on the determination of the time and frequency resource allocations.

In certain aspects, at 806, the second UE may communicate with the first UE, for example, by transmitting data to the first UE in accordance with the resource reservations (e.g., at the scheduled time-domain resources and with the allocated frequency-domain resources). In other aspects, at 806, the second UE may communicate with the first UE by receiving data transmissions from the second UE in accordance with the resource reservations. In aspects, the second UE may communicate with the first UE by monitoring a control channel at time-domain resources associated with the resource reservations. In some cases, the second UE may not be the target for the data transmissions associated with the resource reservations, where the second UE monitors the control channel for the control information described herein to determine when resource reservations are enabled to be reclaimed or released without having to monitor a feedback channel.

According to certain aspects, the receiver UE may receive the number of valid reservations in the SCI and/or an indication of whether a reservation is valid or invalid. For example with respect to operations 800, the control information may indicate a number of valid resource reservations in the control information, and the valid resource reservations may include the resource reservations received at 802. In certain aspects, a certain value (e.g. all zeroes) of a reservation field may indicate that the reservation field does not correspond to a valid resource reservation (e.g., an invalid resource reservation). For example, the control information may include a plurality of reservation fields, each of the reservations fields is associated with a resource reservation, and at least one of the reservation fields has a value that indicates the resource reservation associated with the reservation field is invalid.

In other aspects, a field in the SCI may indicate the number of valid reservations in the SCI. As an example, the valid reservation fields may be sequential starting from the first reservation field in the SCI, and the field may provide the length of the valid reservations in the sequence of the reservation fields of the SCI. The reservation fields that do not correspond to valid reservations (e.g., invalid resource reservations) may be repurposed for other communications. With respect to operations 800, the control information may include a sequence of reservation fields, each of the reservation fields is associated with a resource reservation, and the control information may include a field that indicates a segment of the reservations fields (a first segment or last segment) in the sequence is associated with the valid resource reservations. The field may provide the length of the segment of reservation fields. In other words, the field may be a number indicating a length of the segment of the reservation fields in the sequence. The segment of the reservation fields associated with valid resource reservations may include the first or last resource reservation in the sequence.

In certain aspects, a bitmap field in the SCI may indicate which reservation fields correspond to valid reservations. The reservation fields that do not correspond to valid reservations (e.g., invalid resource reservations) may be repurposed for other communications. With respect to operations 800, the control information may include a bitmap having a plurality of bits, each of the bits of the bitmap corresponds to a resource reservation in the control information, and at least one of the bits indicates the resource reservation associated with the bit is invalid. In other aspects, a bit flag may be associated with each reservation field, and the flag may indicate whether that particular reservation is valid or invalid.

While the examples provided herein are described with respect to resource reservations being set in terms of slots, aspects of the present disclosure may also be applied to other suitable time-domain units including mini-slots (sub-slots) or symbols.

Figure 9:
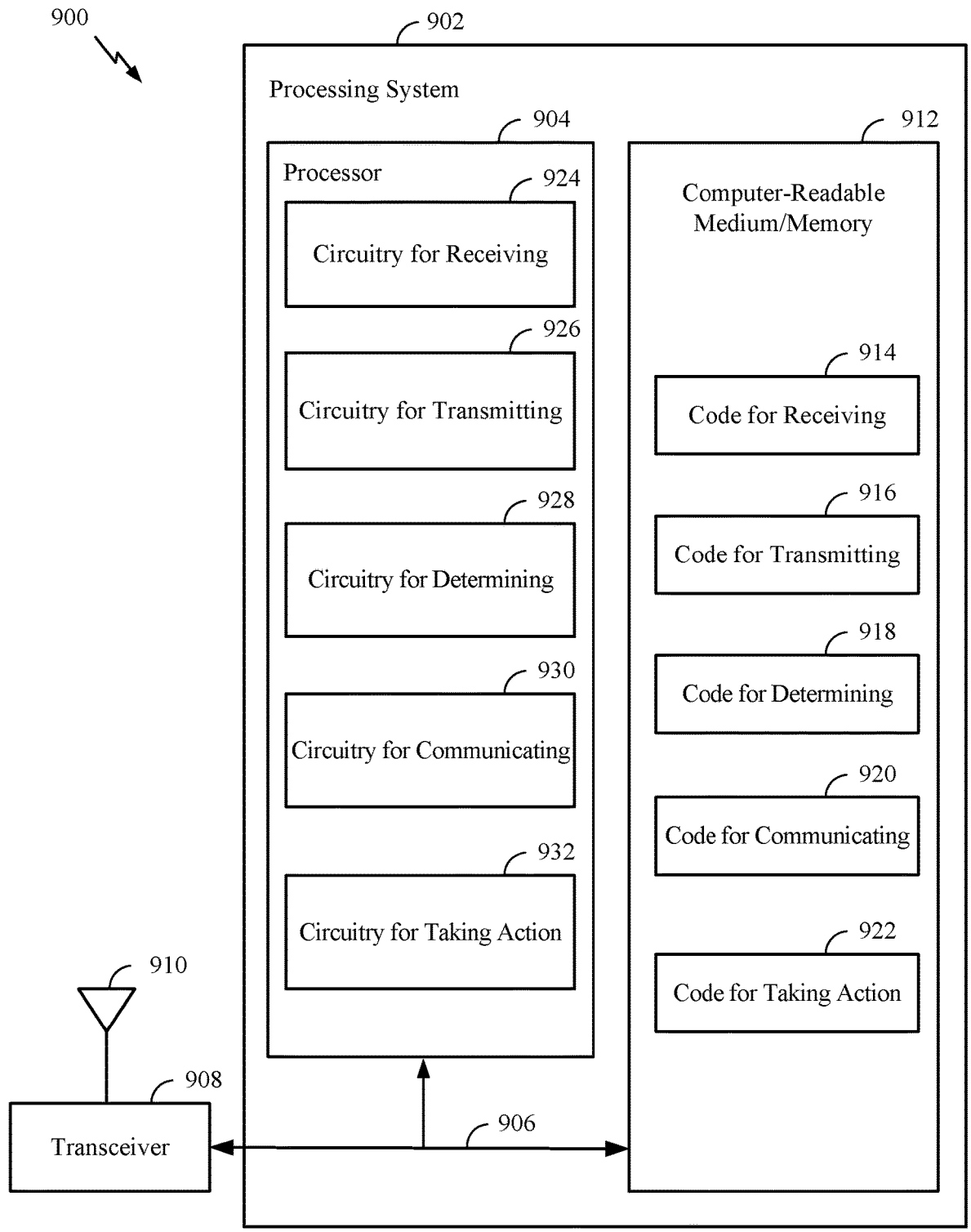
FIG. 9 illustrates a communications device that may include various components configured to perform operations for the techniques disclosed herein in accordance with aspects of the present disclosure.

FIG. 9 illustrates a communications device 900 (e.g., UE 120a or UE 120b) that may include various components (e.g., corresponding to means-plus-function components) configured to perform operations for the techniques disclosed herein, such as the operations illustrated in FIGS. 5-8. The communications device 900 includes a processing system 902 coupled to a transceiver 908 (e.g., a transmitter and/or receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 5-8, or other operations for performing the various techniques discussed herein for managing resource reservations for sidelink transmissions.

In certain aspects, computer-readable medium/memory 912 stores code for receiving (including code for obtaining) 914, code for transmitting 916, code for determining 918, code for communicating 920, and/or code for taking action (including code for refraining from communicating and/or code for communicating) 922. In certain aspects, the processor 904 has circuitry configured to implement the code stored in the computer-readable medium/memory 912. The processor 904 includes circuitry for receiving (including circuitry for obtaining) 924 (an example of means for receiving), circuitry for transmitting 926 (an example of means for transmitting), circuitry for determining 928 (an example of means for determining), circuitry for communicating 930 (an example of means for communicating), and/or circuitry for taking action (including circuitry for refraining from communicating and/or circuitry for communicating) 932 (an example of means for taking action).

Means for receiving may include an antenna (e.g., the antennas 252a-252r), a transceiver (e.g., the transceivers 254a-254r), a processor (e.g., the controller/processor 280), and/or circuitry for receiving (e.g., the circuitry for receiving 924). Means for transmitting may include an antenna (e.g., the antennas 252a-252r), a transceiver (e.g., the transceivers 254a-254r), a processor (e.g., the controller/processor 280), and/or circuitry for transmitting (e.g., the circuitry for transmitting 926). Means for determining may include a processor (e.g., the controller/processor 280) and/or circuitry for determining (e.g., the circuitry for determining 928). Means for communicating may include a processor (e.g., the controller/processor 280) and/or circuitry for communicating (e.g., the circuitry for communicating 930). Means for taking action may include a processor (e.g., the controller/processor 280) and/or circuitry for taking action (e.g., the circuitry for taking action 932). In certain aspects, various processors and/or various circuitry may include a circuit, a central processing unit (CPU), a graphics processing unit (GPU), a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein.

In addition to the examples described above, many examples of specific combinations are within the scope of the disclosure, some of which are detailed below:

Example 1: A method of wireless communication by a first user equipment (UE), comprising determining a plurality of resource reservations allocated for sidelink communications with at least one second UE; transmitting, to the at least one second UE, control information having an indication of the resource reservations; communicating with the at least one second UE during at least one of the resource reservations; determining that a remaining set of the resource reservations is enabled to be reclaimed by one or more UEs; and taking one or more actions based on the determination that the remaining set of the resource reservations is enabled to be reclaimed by the one or more UEs.

Example 2: The method of example 1, wherein determining that the remaining set of the resource reservations is enabled to be reclaimed comprises determining that the remaining set of the resource reservations is enabled to be reclaimed based on a threshold value associated with the resource reservations Example 3: The method of example 2, wherein determining that the remaining set of the resource reservations is enabled to be reclaimed comprises determining if a total number of the resource reservations in the control information is equal to or greater than the threshold value, the remaining set of the resource reservations is enabled to be reclaimed.

Example 4: The method of examples 1-3, wherein taking one or more actions comprises transmitting, to the at least one second UE, additional control information indicating that one or more resource reservations within the remaining set of the resource reservations are released from being reserved for communications between the first UE and the at least one second UE.

Example 5: The method of example 4, wherein the additional control information includes a field indicating that the one or more resource reservations within the remaining set of the resource reservations are released.

Example 6: The method of example 4, wherein transmitting the additional control information comprises transmitting the additional control information within a time-domain resource associated with a resource reservation following the at least one resource reservation and within the remaining set of the resource reservations; and the additional control information indicates that a single resource reservation is reserved for communications between the first UE and the at least one second UE.

Example 7: The method of example 4, wherein the additional control information indicates a number of valid resource reservations in the additional control information; and the one or more resource reservations within the remaining set of the resource reservations include invalid resource reservations in the additional control information.

Example 8: The method of examples 1-7, wherein the control information indicates a number of valid resource reservations in the control information; and the valid resource reservations include the determined resource reservations.

Example 9: The method of example 8, wherein the control information includes a plurality of reservation fields; each of the reservations fields is associated with a resource reservation; and at least one of the reservation fields has a value that indicates the resource reservation associated with the reservation field is invalid.

Example 10: The method of example 8, wherein the control information includes a sequence of reservation fields; each of the reservation fields is associated with a resource reservation; the control information includes a field that indicates a segment of the reservations fields in the sequence is associated with the valid resource reservations; the field is a number indicating a length of the segment of the reservation fields in the sequence; and the segment of the reservation fields includes a first resource reservation in the sequence.

Example 11: The method of example 8, wherein the control information includes a bitmap having a plurality of bits; each of the bits of the bitmap corresponds to a resource reservation in the control information; and at least one of the bits indicates the resource reservation associated with the bit is invalid.

Example 12: The method of examples 1-11, wherein taking one or more actions comprises refraining from communicating with the at least one second UE during one or more resource reservations within the remaining set of the resource reservations.

Example 13: The method of examples 1-11, wherein taking one or more actions comprises communicating with another UE during one or more resource reservations within the remaining set of the resource reservations.

Example 14: A method of wireless communication by a second user equipment (UE), comprising receiving, from a first UE, control information having an indication of resource reservations allocated for sidelink communications with the first UE; communicating with the first UE during at least one of the resource reservations; determining that a remaining set of the resource reservations is enabled to be reclaimed by one or more UEs; and taking one or more actions based on the determination that the remaining set of the resource reservations is enabled to be reclaimed by the one or more UEs.

Example 15: The method of example 14, wherein determining that the remaining set of the resource reservations is enabled to be reclaimed comprises determining that the remaining set of the resource reservations is enabled to be reclaimed based on a threshold value.

Example 16: The method of example 15, wherein determining that the remaining set of the resource reservations is enabled to be reclaimed comprises determining if a number of the resource reservations in the control information is equal to or greater than the threshold value, the remaining set of the resource reservations is enabled to be reclaimed.

Example 17: The method of examples 14-16, further comprising receiving, from the first UE, additional control information indicating that one or more resource reservations within the remaining set of the resource reservations are released from being reserved for communications with the first UE.

Example 18: The method of example 14, wherein the additional control information includes a field indicating that the one or more resource reservations within the remaining set of the resource reservations are released.

Example 19: The method of example 17, wherein receiving the additional control information comprises receiving the additional control information within a time-domain resource associated with a resource reservation following the at least one resource reservation and within the remaining set of the resource reservations; and the additional control information indicates that a single resource reservation is reserved for communications with the first UE.

Example 20: The method of example 17, wherein the additional control information indicates a number of valid resource reservations in the additional control information; and the one or more resource reservations within the remaining set of the resource reservations include invalid resource reservations in the additional control information.

Example 21: The method of examples 14-20, wherein the control information indicates a number of valid resource reservations in the control information; and the valid resource reservations include the determined resource reservations.

Example 22: The method of example 21, wherein the control information includes a plurality of reservation fields; each of the reservations fields is associated with a resource reservation; and at least one of the reservation fields has a value that indicates the resource reservation associated with the reservation field is invalid.

Example 23: The method of example 21, wherein the control information includes a sequence of reservation fields; each of the reservation fields is associated with a resource reservation; the control information includes a field that indicates a segment of the reservations fields in the sequence is associated with the valid resource reservations; the field is a number indicating a length of the segment of the reservation fields in the sequence; and the segment of the reservation fields includes a first resource reservation in the sequence.

Example 24: The method of example 21, wherein the control information includes a bitmap having a plurality of bits; each of the bits of the bitmap corresponds to a resource reservation in the control information; and at least one of the bits indicates the resource reservation associated with the bit is not valid.

Example 25: The method of examples 14-24, wherein taking one or more actions comprises refraining from communicating with the first UE during one or more resource reservations within the remaining set of the resource reservations.

Example 26: The method of examples 14-24, wherein taking one or more actions comprises communicating with another UE during one or more resource reservations within the remaining set of the resource reservations.

Example 27: An apparatus for wireless communication, comprising a processing system configured to determine a plurality of resource reservations allocated for sidelink communications with at least one user equipment (UE); and a transceiver configured to transmit, to the at least one UE, control information having an indication of the resource reservations, and communicate with the at least one UE during at least one of the resource reservations; wherein the processing system is further configured to determine that a remaining set of the resource reservations is enabled to be reclaimed by one or more UEs, and take one or more actions based on the determination that the remaining set of the resource reservations is enabled to be reclaimed by the one or more UEs.

Example 28: The apparatus of example 27, wherein the control information indicates a number of valid resource reservations in the control information; and the valid resource reservations include the determined resource reservations.

Example 29: An apparatus for wireless communication, comprising a transceiver configured to receive, from a user equipment (UE), control information having an indication of resource reservations allocated for sidelink communications with the UE, and communicate with the UE during at least one of the resource reservations; and a processing system configured to determine that a remaining set of the resource reservations is enabled to be reclaimed by one or more UEs, and take one or more actions based on the determination that the remaining set of the resource reservations is enabled to be reclaimed by the one or more UEs.

Example 30: The apparatus of example 29, wherein the control information indicates a number of valid resource reservations in the control information; and the valid resource reservations include the determined resource reservations.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a first user equipment (UE), comprising:
   determining a plurality of resource reservations for sidelink communications with at least one second UE;
   transmitting, to the at least one second UE, control information having an indication of the resource reservations;
   communicating with the at least one second UE during at least one of the resource reservations;
   determining that a remaining set of the resource reservations is enabled to be reclaimed by one or more UEs, comprising determining that when a total number of the resource reservations in the control information is equal to or greater than a threshold value, the remaining set of the resource reservations is enabled to be reclaimed; and
   taking one or more actions based on the determination that the remaining set of the resource reservations is enabled to be reclaimed by the one or more UEs.

2. The method of claim 1, wherein taking one or more actions comprises:
   transmitting, to the at least one second UE, additional control information indicating that one or more resource reservations within the remaining set of the resource reservations are released from being reserved for communications between the first UE and the at least one second UE.

3. The method of claim 2, wherein the additional control information includes a field indicating that the one or more resource reservations within the remaining set of the resource reservations are released.

4. The method of claim 2, wherein:
   transmitting the additional control information comprises transmitting the additional control information within a time-domain resource associated with a resource reservation following the at least one resource reservation and within the remaining set of the resource reservations; and
   the additional control information indicates that a single resource reservation is reserved for communications between the first UE and the at least one second UE.

5. The method of claim 2, wherein:
the additional control information indicates a number of valid resource reservations in the additional control information; and
the one or more resource reservations within the remaining set of the resource reservations include invalid resource reservations in the additional control information.

6. The method of claim 1, wherein:
the control information indicates a number of valid resource reservations in the control information; and
the valid resource reservations include the determined resource reservations.

7. The method of claim 6, wherein:
the control information includes a plurality of reservation fields;
each of the reservations fields is associated with a resource reservation; and
at least one of the reservation fields has a value that indicates the resource reservation associated with the reservation field is invalid.

8. The method of claim 6, wherein:
the control information includes a sequence of reservation fields;
each of the reservation fields is associated with a resource reservation;
the control information includes a field that indicates a segment of the reservations fields in the sequence is associated with the valid resource reservations;
the field is a number indicating a length of the segment of the reservation fields in the sequence; and
the segment of the reservation fields includes a first resource reservation in the sequence.

9. The method of claim 6, wherein:
the control information includes a bitmap having a plurality of bits;
each of the bits of the bitmap corresponds to a resource reservation in the control information; and
at least one of the bits indicates the resource reservation associated with the bit is invalid.

10. The method of claim 1, wherein taking one or more actions comprises refraining from communicating with the at least one second UE during one or more resource reservations within the remaining set of the resource reservations.

11. The method of claim 1, wherein taking one or more actions comprises communicating with another UE during one or more resource reservations within the remaining set of the resource reservations.

12. A method of wireless communication by a second user equipment (UE), comprising:
receiving, from a first UE, control information having an indication of resource reservations for sidelink communications with the first UE;
communicating with the first UE during at least one of the resource reservations;
determining that a remaining set of the resource reservations is enabled to be reclaimed by one or more UEs, comprising determining that when a number of the resource reservations in the control information is equal to or greater than a threshold value, the remaining set of the resource reservations is enabled to be reclaimed; and
taking one or more actions based on the determination that the remaining set of the resource reservations is enabled to be reclaimed by the one or more UEs.

13. The method of claim 12, further comprising:
receiving, from the first UE, additional control information indicating that one or more resource reservations within the remaining set of the resource reservations are released from being reserved for communications with the first UE.

14. The method of claim 13, wherein the additional control information includes a field indicating that the one or more resource reservations within the remaining set of the resource reservations are released.

15. The method of claim 13, wherein:
receiving the additional control information comprises receiving the additional control information within a time-domain resource associated with a resource reservation following the at least one resource reservation and within the remaining set of the resource reservations; and
the additional control information indicates that a single resource reservation is reserved for communications with the first UE.

16. The method of claim 13, wherein:
the additional control information indicates a number of valid resource reservations in the additional control information; and
the one or more resource reservations within the remaining set of the resource reservations include invalid resource reservations in the additional control information.

17. The method of claim 12, wherein:
the control information indicates a number of valid resource reservations in the control information; and
the valid resource reservations include the determined resource reservations.

18. The method of claim 17, wherein:
the control information includes a plurality of reservation fields;
each of the reservations fields is associated with a resource reservation; and
at least one of the reservation fields has a value that indicates the resource reservation associated with the reservation field is invalid.

19. The method of claim 17, wherein:
the control information includes a sequence of reservation fields;
each of the reservation fields is associated with a resource reservation;
the control information includes a field that indicates a segment of the reservations fields in the sequence is associated with the valid resource reservations;
the field is a number indicating a length of the segment of the reservation fields in the sequence; and
the segment of the reservation fields includes a first resource reservation in the sequence.

20. The method of claim 17, wherein:
the control information includes a bitmap having a plurality of bits;
each of the bits of the bitmap corresponds to a resource reservation in the control information; and
at least one of the bits indicates the resource reservation associated with the bit is not valid.

21. The method of claim 12, wherein taking one or more actions comprises refraining from communicating with the first UE during one or more resource reservations within the remaining set of the resource reservations.

22. The method of claim 12, wherein taking one or more actions comprises communicating with another UE during one or more resource reservations within the remaining set of the resource reservations.

23. An apparatus for wireless communication, comprising:
a memory;
a processor coupled to the memory, the processor and the memory being configured to determine a plurality of resource reservations for sidelink communications with at least one user equipment (UE); and
a transceiver configured to:
transmit, to the at least one UE, control information having an indication of the resource reservations, and
communicate with the at least one UE during at least one of the resource reservations;
wherein the processor and the memory are further configured to:
determine that a remaining set of the resource reservations is enabled to be reclaimed by one or more UEs by determining that when a total number of the resource reservations in the control information is equal to or greater than a threshold value, the remaining set of the resource reservations is enabled to be reclaimed, and
take one or more actions based on the determination that the remaining set of the resource reservations is enabled to be reclaimed by the one or more UEs.

24. The apparatus of claim 23, wherein:
the control information indicates a number of valid resource reservations in the control information; and
the valid resource reservations include the determined resource reservations.

25. The apparatus of claim 23, wherein the transceiver is further configured to:
transmit, to the at least one UE, additional control information indicating that one or more resource reservations within the remaining set of the resource reservations are released from being reserved for communications between the apparatus for wireless communication and the at least one UE.

26. An apparatus for wireless communication, comprising:
a transceiver configured to:
receive, from a user equipment (UE), control information having an indication of resource reservations for sidelink communications with the UE, and
communicate with the UE during at least one of the resource reservations;
a memory; and
a processor coupled to the memory, the processor and the memory being configured to:
determine that a remaining set of the resource reservations is enabled to be reclaimed by one or more UEs by determining that when a total number of the resource reservations in the control information is equal to or greater than a threshold value, the remaining set of the resource reservations is enabled to be reclaimed, and
take one or more actions based on the determination that the remaining set of the resource reservations is enabled to be reclaimed by the one or more UEs.

27. The apparatus of claim 26, wherein:
the control information indicates a number of valid resource reservations in the control information; and
the valid resource reservations include the determined resource reservations.

28. The apparatus of claim 26, wherein the transceiver is further configured to:
receive, from the UE, additional control information indicating that one or more resource reservations within the remaining set of the resource reservations are released from being reserved for communications with the UE.

* * * * *